United States Patent
Heifets et al.

(10) Patent No.: US 7,991,799 B2
(45) Date of Patent: *Aug. 2, 2011

(54) SCHEMA SPECIFIC PARSER GENERATION

(75) Inventors: Abraham Heifets, Cambridge, MA (US); Margaret G. Kostoulas, Veroia (GR); Moshe Morris Emanuel Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/758,047

(22) Filed: Jun. 5, 2007

(65) Prior Publication Data

US 2008/0104105 A1 May 1, 2008

Related U.S. Application Data

(60) Provisional application No. 60/803,912, filed on Jun. 5, 2006.

(51) Int. Cl.
*G06F 7/00* (2006.01)
*G06F 17/30* (2006.01)
(52) U.S. Cl. ......... 707/803; 717/100; 717/124; 717/149
(58) Field of Classification Search .................. None
See application file for complete search history.

(56) References Cited

U.S. PATENT DOCUMENTS

| | | | |
|---|---|---|---|
| 6,782,379 B2 * | 8/2004 | Lee | 707/999.002 |
| 6,789,252 B1 * | 9/2004 | Burke et al. | 717/100 |
| 7,200,805 B2 | 4/2007 | Carlson | |
| 2001/0047385 A1 * | 11/2001 | Tuatini | 709/203 |
| 2001/0054172 A1 | 12/2001 | Tuatini | |
| 2002/0111965 A1 | 8/2002 | Kutter | |
| 2004/0073870 A1 | 4/2004 | Fuh | |
| 2004/0216086 A1 | 10/2004 | Bau | |
| 2005/0038816 A1 | 2/2005 | Easton | |
| 2005/0097455 A1 * | 5/2005 | Zhou et al. | 715/513 |
| 2006/0129605 A1 | 6/2006 | Doshi | |
| 2006/0259898 A1 * | 11/2006 | Reinhardt | 717/124 |
| 2007/0250766 A1 | 10/2007 | Medi | |
| 2007/0282894 A1 | 12/2007 | Schneider | |
| 2008/0104095 A1 | 5/2008 | Heifets | |
| 2008/0104592 A1 | 5/2008 | Heifets | |

* cited by examiner

*Primary Examiner* — Sathyanarayan Pannala
(74) *Attorney, Agent, or Firm* — Cuenot, Forsythe & Kim, LLC

(57) ABSTRACT

A computer-implemented method of creating a schema specific parser for processing Extensible Markup Language (XML) documents can include identifying a plurality of XML processing templates, wherein each of the plurality of XML processing templates performs a specific task of processing an XML document against an XML schema component. An XML schema including a plurality of components can be received. A hierarchy of the plurality of components of the XML schema can be determined. An execution plan specifying a hierarchy of XML processing instructions can be created, wherein each XML processing instruction is associated with an XML processing template from the plurality of XML processing templates. The hierarchy of the XML processing templates can be determined according to the hierarchy of components of the XML schema. The execution plan can be compiled to generate the schema specific parser. The schema specific parser can be output.

20 Claims, 6 Drawing Sheets

200

| XML Processing Templates / Instructions | Functionality |
|---|---|
| READ_TAG *ISMIXED* | Read forward to the end of the next tag in either mixed mode (allowing both text characters and elements) or element-only mode. The tag to be consumed may be any start or end tag. End tags are checked for well-formedness against matching or corresponding start tags. |
| READ_TAG_WITH_QNAME *ISMIXED QNAME* | Read forward to the end of the next tag in either mixed mode or element-only mode. While scanning, validate that the name of the tag matches the given QName. The input stream can be directly compared against a fixed tag name. Symbol table lookup is avoided since the identifier is already known. |
| READ_END_TAG *ISMIXED* | Read forward to the end of the next tag in either mixed mode or element-only mode. While scanning, verify that the tag is an end tag, and match the end tag lexically against the balancing start tag. Compares the input buffer against a known string, in this case the balancing start tag. |
| READ_EMPTY | Read the next tag, which must be an end tag, and must match the corresponding and balancing start tag. Validate that there is no intervening character content. This instruction functions similar to READ END TAG, except that it also validates that no character content was read. |
| READ_SIMPLE_CONTENT *TYPEID* | Read character data forward to the end of the next tag, which must be an end tag, and must match its balancing start tag. Validate the intervening content using the built-in simple type handler given by the type ID. Content is handled by a type-specific scanner that can validate the content as scanned. The end tag can be handled as in READ END TAG. |
| READ_EOF | Read forward to the end of the file, matching the XML production for TrailingMisc, e.g., checking well-formedness of comments, processing-instructions, white-space, etc. |

| XML Processing Templates / Instructions | Functionality |
|---|---|
| ASSERT_TAG_QNAME *ALLOWEDQNAMES={QNAMEID ...}* | Assert that the current tag matches one of the members of the set of allowed QNames. |
| ASSERT_ATTRS *ALLOWEDATTRIBUTESET REQUIREDATTRIBUTESET* | Assert that the attributes of the current tag obey the collective attribute occurrence constraint as represented with two sets, one for excluded attributes and one for required attributes. |
| ASSERT_ATTR_CONTENT *QNAMEID TYPEID* | Check the attributes of the current tag for the given attribute QName, and if present, validate content using the built-in simple type handler given by the type ID. |
| FAIL | Unconditional assertion failure. |

| XML Processing Templates / Instructions | Functionality |
|---|---|
| PUSH_NEW_ALL_OCCURRENCE_SET | Push a new, empty set onto the all occurrence set stack. |
| TEST_AND_SET ENTRY *ID* | Add the given ID to the current set, asserting that the given ID was not already present. |
| POP_ASSERT_SET *REQD SET* | Pop the current set off of the set stack and assert that the current set is a superset of the given required IDs to check "all group" occurrence constraints of XML schema. |
| PUSH_COUNTER | Push a new counter onto the stack and initialize to zero. |
| INCREMENT_COUNTER | Increment the top counter on the stack. |
| POP_COUNTER | Discard the top counter on the stack. |
| JUMP_COUNTER LESS *VALUE LABEL* | Branch to the given label if the top counter is less than the given value. |
| ASSERT_COUNTER_GREATER_OR_EQUAL *VALUE* | Assert that the top counter is greater or equal to the given minimum value. Otherwise, fail. |

| XML Processing Templates / Instructions | Functionality |
|---|---|
| JUMP_TAG_NOT_EQUAL *QNAMEID LABEL* | Branch to the instruction at the given label if the tag does not match the given QName. |
| JUMP_UNCONDITIONAL *LABEL* | Branch unconditionally to the given label. |
| CALL_TYPE *NIL DEFAULTTYPE EXCLUDEDTYPESET* | Dispatch to the content model for the current start tag. The content model is determined either by the instance value of xsi:type or by the supplied default type ID. The actual type ID is checked against the type exclusions set (EXCLUDEDTYPESET). The excluded types aggregate the various constraints on the runtime type of the elements as specified by the element declaration and the type definition for the default type. If the resolved type is complex, the parser dispatches to the handler for that complex type, and resumes processing. If the resolved type is simple, the corresponding built-in simple type handler is used. The NIL argument tells the complex type which processing is allowed for xsi:nil in this context. |
| RETURN | Return control from the current complex type handler to its caller. |
| RETURN_IF_NIL | Check the attributes of the current tag for the xsi:nil attribute. If present and bearing the value true, read the next tag as in READ EMPTY, and return control from the current complex type handler to its caller. In all other cases, continue execution. |

```
<xsd:complexType name="ExampleType">
        <xsd:sequence>
                <xsd:choice>
                        <xsd:element name="Name1" type="Type1"/>
                        <xsd:element name="Name2" type="Type2"/>
                </xsd:choice>
                <xsd:element name="Name3" type="Type3"/>
        </xsd:sequence>
<xsd:attribute name="attr1" type="xsd:string" use="required"/>
<xsd:attribute name="attr2" type="xsd:string"/>
<xsd:attribute name="attr3" type="xsd:string"/>
</xsd:complexType>
```

```
<exampleType attr1="foo" attr2="bar" attr3="baz">
        <Name2> .... </Name2>
        <Name3> .... </Name3>
</exampleType>
```

```
        ASSERT_ATTRS AllowedAttributeSet={'attr1','attr2','attr3'} RequiredAttributeSet={'attr1'}
        ASSERT_ATTR_CONTENT 'attr1' xsd:string
        ASSERT_ATTR_CONTENT 'attr2' xsd:string
        ASSERT_ATTR_CONTENT 'attr3' xsd:string
        READ_TAG QNAMES element-onlyAllowedNames={'Name1', 'Name2'}
        JUMP_TAG_NOT_EQUAL 'Name1' 10
        CALL_TYPE non-nillable defaultType=Type1 AllowedTypes={Type1}
        JUMP_UNCONDITIONAL 11
10      CALL_TYPE non-nillable defaultType=Type2 AllowedTypes={Type2}
11      READ_TAG_WITH_QNAME element-only 'Name3'
        CALL_TYPE non-nillable defaultType=Type3 AllowedTypes={Type3}
        READ_END_TAG
        RETURN
```

FIG. 9

SCHEMA SPECIFIC PARSER GENERATION

CROSS-REFERENCE TO RELATED APPLICATIONS

This application claims the benefit of Provisional Patent Application No. 60/803,912, filed in the United States Patent and Trademark Office on Jun. 5, 2006, the entirety of which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Extensible Markup Language (XML) refers to a flexible type of data encoding. XML coded messages can be exchanged between computer programs of a system without concern over aspects of the system such as the type of programming language in which each respective computer program is implemented, the type of information processing systems involved, or the manner of message transmission. XML allows virtually any component of a system, e.g., a UNIX program, to communicate with any other component of the system, e.g., a program written in the C programming language for execution within a Windows-type of computing environment.

XML schemas specify classes of allowable XML documents, or XML messages, that a system will accept. In general, an "XML schema" refers to a type of XML document that expresses constraints on the structure and content of XML documents that can be accepted by a given system. Publishing an XML schema allows a system to define the type of messages that the system is willing to accept. A validating parser can analyze received XML documents with respect to an XML schema and discard non-conforming or invalid XML documents.

BRIEF SUMMARY OF THE INVENTION

The present invention relates to creating parsers for processing Extensible Markup Language (XML) documents with respect to an XML schema. One embodiment of the present invention can include a computer-implemented method of creating a schema specific parser for processing XML documents. The method can include identifying a plurality of XML processing templates, wherein each of the plurality of XML processing templates performs a specific task of processing, e.g., parsing and/or validating, an XML document against an XML schema component. The method further can include identifying an XML schema including a plurality of components, determining a hierarchy of the plurality of components of the XML schema, and creating an execution plan specifying a hierarchy of XML processing instructions. Each of the XML processing instructions can be associated with an XML processing template of the plurality of XML processing templates. The hierarchy of the XML processing instructions can be determined according to the hierarchy of components of the XML schema. The execution plan can be compiled to generate the schema specific parser. The schema specific parser can be output.

Another embodiment of the present invention can include a system for creating a schema specific parser for processing XML documents. The system can include a library including a plurality of XML processing templates. Each XML processing template can include source code that, when compiled, performs a particular task of processing an XML document against an XML schema component. The system also can include a parser generator that determines a hierarchy of an XML schema and creates an execution plan specifying a hierarchy of XML processing instructions according to the hierarchy of the XML schema. Each XML processing instruction can be associated with an XML processing template of the plurality of XML processing templates. The parser generator can compile the execution plan and output the schema specific parser.

Yet another embodiment of the present invention can include a computer program product including a computer-usable medium having computer-usable code that, when executed, causes a machine to perform the various steps and/or or functions described herein.

BRIEF DESCRIPTION OF THE SEVERAL VIEWS OF THE DRAWINGS

FIG. 2 is a table illustrating XML processing instructions and functionality of associated XML processing templates (templates) of the XML processing template library of FIG. 1 in accordance with another embodiment of the present invention.

FIG. 3 is a table illustrating XML processing instructions and functionality of associated templates of the XML processing template library of FIG. 1 in accordance with another embodiment of the present invention.

FIG. 4 is a table illustrating XML processing instructions and functionality of associated templates of the XML processing template library of FIG. 1 in accordance with another embodiment of the present invention.

FIG. 5 is a table illustrating XML processing instructions and functionality of associated templates of the XML processing template library of FIG. 1 in accordance with another embodiment of the present invention.

FIG. 7 is an example of an XML schema fragment which is useful for understanding embodiments of the present invention.

FIG. 8 is an example of an XML document that is to be validated against the XML schema fragment of FIG. 7.

FIG. 9 is an example of a fragment of an execution plan that can be automatically generated by the system of FIG. 1 in accordance with another embodiment of the present invention.

DETAILED DESCRIPTION OF THE INVENTION

Figure 1:
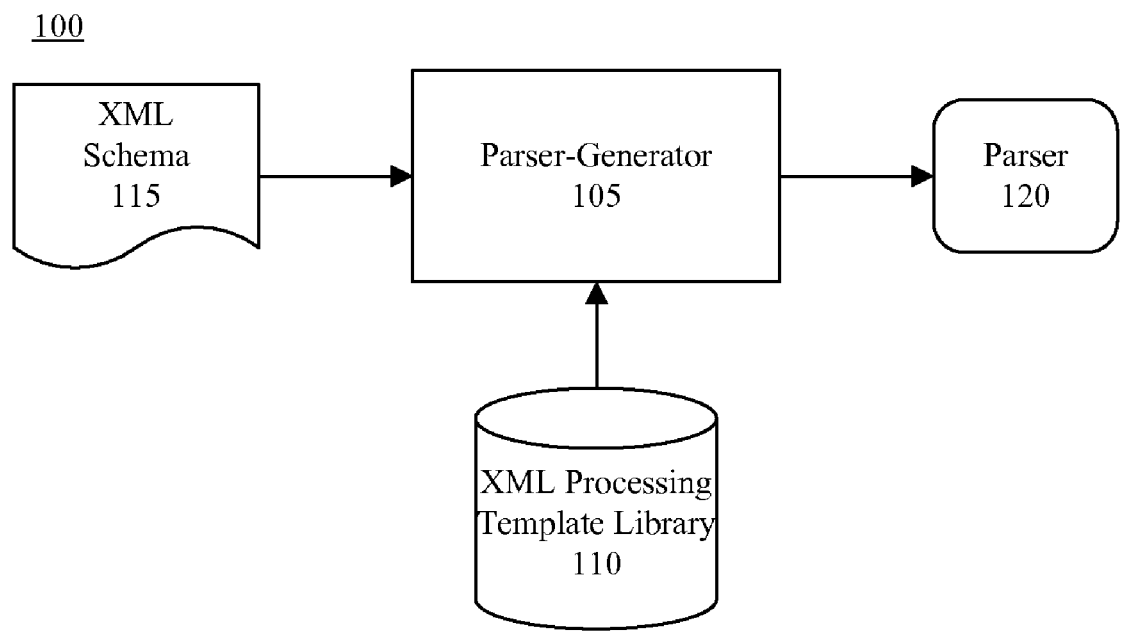
FIG. 1 is a block diagram illustrating a system that automatically generates an Extensible Markup Language (XML) schema specific parser in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain or store the program for use by, or in connection with, the instruction execution system, apparatus, or device.

Any suitable computer-usable or computer-readable storage may be utilized. For example, the storage can include an electronic, magnetic, optical, electromagnetic, or semiconductor system (or apparatus or device). A non-exhaustive list of exemplary computer-readable storages can include magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory), or other data storage devices.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or other similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to the automatic creation of a schema specific parser. A parser-generator can be configured to analyze an Extensible Markup Language (XML) schema. With reference to the XML schema, the parser-generator can create an execution plan specifying XML processing templates. The XML processing templates refer to high level functions suited for parsing and/or validating an XML document against an XML schema. The structure of the execution plan can correspond to the structure and/or arrangement of components of the XML schema. The execution plan can be compiled to generate the schema specific parser.

FIG. 1 is a block diagram illustrating a system 100 that automatically generates an XML schema specific parser in accordance with one embodiment of the present invention. As shown, the system 100 can include a parser-generator 105 and an XML processing template library 110. In general, the parser-generator 105, given an XML schema, such as XML schema 115, as input, can generate and output a schema specific parser, e.g., parser 120.

The XML processing template library 110 can include a plurality of XML processing templates (templates) relating to the processing of XML documents. More particularly, each template can perform a function or task for parsing and/or validating an XML document. Each template can be implemented as a source code template, e.g., a listing of code, that, when compiled, performs a particular task of XML document parsing and/or validation. Each template can be written at a high level of granularity. In illustration, each template can perform a particular function that is needed or related to parsing and/or validating an XML document against a given XML schema or particular XML schema component.

For example, one template can read a tag of the XML document being processed. Another template can check attributes allowed for the component corresponding to that tag. A "component," as used herein, can refer to a component as defined in section 3 of "XML Schema Part 1: Structures Second Edition, W3C," and "XML Schema Part 2: Datatypes Second Edition," which are incorporated herein by reference.

In one embodiment, templates can be organized or combined to form handlers. As such, each handler can include one or more templates. For example, a handler that will be tasked with, among other things, validating a date can include a template, or function, for validating dates. The template may or may not be passed one or more parameters that can be extracted from the XML schema. Other templates can be included within different handlers as may be required. In another embodiment, a handler can refer to a collection of one or more templates that collectively process a component.

Without such "coarse-grained" procedures, parsing and/or validating an XML document would be implemented using much lower level primitives, e.g., on the order of using many individual programming statements rather than XML processing tasks directed to the component level, element level, and/or directed to processing sections of an XML document as the case may be. Using low level primitives to synthesize the tasks needed for XML document processing can complicate automatic code generation as each XML processing task is formulated from a significant number of low level primitives, rather than from several higher level templates. Use of low level primitives also complicates code generation across different software environments, e.g., generating schema specific parsers in C, Java, or other programming languages.

In operation, the parser-generator 105 can receive an XML schema 115 as input. In general, the parser-generator 105 can analyze the XML schema 115 on a component-by-component basis and determine the hierarchy of the XML schema 115. For example, the parser-generator 105 can determine the arrangement of components of the XML schema 115 as well as the structure of such components. In one embodiment, the parser-generator 105 can perform a mapping of components of the XML schema 115 to templates in the XML processing template library 110. Through this mapping process, an execution plan specifying a hierarchy of templates can be generated. The hierarchy of templates can mirror the hierarchy of the XML schema 115. For example, the execution plan can specify a hierarchy of XML processing instructions. Each XML processing instruction can be associated with a template. The XML processing instructions can be organized into one or more handlers.

Conventional XML parser generators typically translate an XML schema into an abstract form called "Deterministic Finite Automata" (DFA) or other forms of grammars. The DFA or other grammars are a collection of states, with transitions between each state specified on different possible inputs. Such grammars are representations of the XML schema that does not explicitly encode any portion of the XML Schema semantics.

In accordance with the embodiments disclosed herein, a substantial portion, if not all, of the execution plan can be mapped directly to the XML schema components. That is, the execution plan can explicitly encode one or more portions, if not all, of the XML schema. The parser-generator 105 can compile the execution plan to produce a native code implementation of the parser 120, e.g., an implementation that does not require an interpreter or other virtual machine for execution by a central processing unit (CPU) of an information processing system.

It should be appreciated that the XML processing template library 110 can include templates written in any of a variety of different programming languages. In one embodiment, the XML processing template library 110 can include a plurality of sets of templates, wherein each set of templates is coded in and available in different programming languages. In that case, the parser-generator 105 can be instructed to create the parser 120 in a specified programming language using a particular set of the templates according to the selected programming language.

For example, the execution plan can specify a hierarchy of templates for processing an XML document. The execution plan, and thus XML processing instructions, can be programming language neutral in that no programming language need be specified by the execution plan. The XML processing template library 110 can include a version of each template, or template code for each template, in C, in Java, and in any of a variety of other programming languages as may be desired. At compile time, the parser-generator 105 can be configured to generate a parser 120 using a selected programming language, e.g., the C programming language. Accordingly, the parser-generator 105 can replace template references within the execution plan, e.g., XML processing instructions, with the template (template code) from the set of templates written in C. In this case, only the versions of the templates written in C would be used. If the parser-generator 105 is configured to generate a parser 120 implemented in Java, the parser-generator 105 can select templates specified by the execution plan from the set of templates implemented in Java. The execution plan then can be compiled.

The resulting parser 120 can include a parsing, e.g., scanning, layer that can read an XML document byte-by-byte as well as a validation layer. The templates of the XML processing template library 110 can include functions for both layers of the parser 120 such that when compiled, the two layers can be intermingled. In illustration, the parsing functionality of the parser 120 can be mixed with the validation functionality such that when a component is scanned, as soon as enough information is scanned to determine whether the component is valid, or invalid, as the case may be, the parser 120 can make a determination at that moment and output a result, e.g., valid or invalid XML document. For example, a simple content component can be read such as a date. The validation layer can determine whether the data is of the correct type prior to proceeding, or scanning, a next component. If not a date, for example, the parser 120 can indicate that the XML document is invalid immediately upon determining the non-conforming component or element rather than continue validation processing until an end tag is encountered.

As noted, the templates of the XML processing template library 110 can be configured so that selected templates implement both the parsing and validation layers. This allows data items such as dates or integers to be scanned and validated. In other words, after reading each character and checking that the characters that were read are legal XML data characters, the templates further can be configured to verify that the data item is legal, e.g., a legal date or integer character, in the read location. The data can further be stored for validation.

For example, consider a decimal that the XML schema restricts to be less than 100. A decimal starting with "2" can continue only with 0-9, dot ("."), or finish. Accordingly, the template functionality need not determine that the next character is any valid character, but one of the enumerated choices noted above. If, for example, the next character is "6" the template function can determine that the decimal is now "26." When the end of the decimal is identified, a check can be performed to determine whether the decimal is less than 100. As such, the data does not have to be revisited after parsing for validation. A separate pass of the data need not be performed solely for validation. The same sort of processing can be performed for dates. With respect to tag-reading, templates can perform similar functionality when tag names are not only valid XML name characters, but also are valid for exactly that tag name.

FIGS. 2-5, taken collectively, illustrate a variety of templates that can be included within the XML processing template library discussed with reference to FIG. 1. The templates of FIGS. 2-5 represent the basic primitives of XML parsing and validation and, as such, are designed to be coarse-gained. The template names are shown in capital letters, while parameters of the templates are shown in italics. The template names and corresponding parameters are examples of the XML processing instructions. Each XML processing instruction can be associated with the template that implements the described functionality. The XML processing instructions, or references to templates, can be used to build the execution plan. The execution plan, comprised of XML processing instructions as shown in FIGS. 2-5, can be compiled.

It should be appreciated that qualified names can be represented in a number of ways such as character strings or symbol table ID numbers. Sets can be represented as bit-vectors, linked lists, arrays, hash-maps, or the like. Control flow may be represented with any of a variety of common techniques such as jumps to offsets, "gotos" to labels, or branching constructs such as if/then/else, switch, choose/when/otherwise, or while/do/end. Allowed and forbidden may be interchangeable representations, e.g., through set negation. The templates illustrated herein are intended to demonstrate the high level of granularity used, e.g., "chunky" templates, as compared to conventional techniques that utilize low level code. Other alternative logic types or constructs similar to those noted above can be used in place of those illustrated in the tables.

FIG. 2 is a table 200 illustrating XML processing instructions and functionality of associated templates of the XML processing template library of FIG. 1 in accordance with another embodiment of the present invention. As noted, the parser-generator of FIG. 1 can create an execution plan referencing the templates of the XML processing template library. The order and hierarchy in which the templates are referenced can be determined according to the hierarchy and/or structure of the XML schema being analyzed.

Table 200 illustrates various templates that read sections and/or components of an XML document into the parser. Portions of the XML document being processed are read into the parser on a byte-by-byte level. Decisions affecting execution of the parsing and/or validation can occur on a component-by-component level. In this regard, one or more of the templates can be combined to parse and/or validate a particular type of component of the XML schema, e.g., simple, complex, mixed, etc. It should be appreciated that, with respect to the descriptions of the various templates, the term "tag" can refer to any start or end tag, including all of the attributes of a tag. Empty element tags can be treated as if the empty element tags have been expressed in an equivalent syntax using separate start and end tags, with no intervening content.

FIG. 3 is a table 300 illustrating XML processing instructions and functionality of associated templates of the XML processing template library of FIG. 1 in accordance with another embodiment of the present invention. The templates listed in table 300 illustrate templates for checking that a component or section of an XML document, once read, matches the type to which the component or section is to correspond per the XML schema. For example, an open tag must contain the attributes and sub-components specified by the declaration type of the component. A close tag must match the current open tag. The templates listed in table 300 can check that a component or section can legally occur in the current XML document position and that the component is the correct type.

FIG. 4 is a table 400 illustrating XML processing instructions and functionality of associated templates of the XML processing template library illustrated in FIG. 1 in accordance with another embodiment of the present invention. The templates listed in table 400 manipulate counters that can be used in counting and/or otherwise dealing with sub-components. Since sub-components can be constrained to have a minimum and/or a maximum number of occurrences within a component, the templates listed in table 400 provide mechanisms for monitoring the number of such occurrences and comparing the occurrences with the minimum and/or maximum number of occurrences specified in the XML schema.

"All group" occurrence constraints in an XML schema allow one to specify that an element needs to include several different children. If any one of the needed children is missing, validation of the XML document fails. This aspect of XML is useful, for example, for representing C structs and/or Java objects, where values are accessed by named fields and are not ordered.

In one embodiment, when validating an input, a set corresponding to the all-group constraint can be maintained. The set may be empty if the XML schema does not use all-group constraints. When a new child is encountered in an all-group constraint, the occurrence of the child can be marked or recorded in the set corresponding to the all-group constraint. When the end of the portion defining the all-group constraint is encountered in the XML document being validated, a check can be performed to ensure that each required child of the all-group constraint was encountered, and thus marked within the set corresponding to the all-group constraint. If a given required child is not encountered, the XML document fails. Since all-group constraints can be nested, a stack of such sets can be used. When a new all-group constraint is encountered, a new set is pushed onto the stack. The set can be popped off of the stack to return to the previous constraint.

FIG. 5 is a table 500 illustrating XML processing instructions and functionality of associated templates of the XML processing template library illustrated in FIG. 1 in accordance with another embodiment of the present invention. The templates listed in table 500 provide mechanisms for flow control. The templates of table 500 allow the appropriate template to be located for processing a next component type or section of an XML document being processed.

Figure 6:
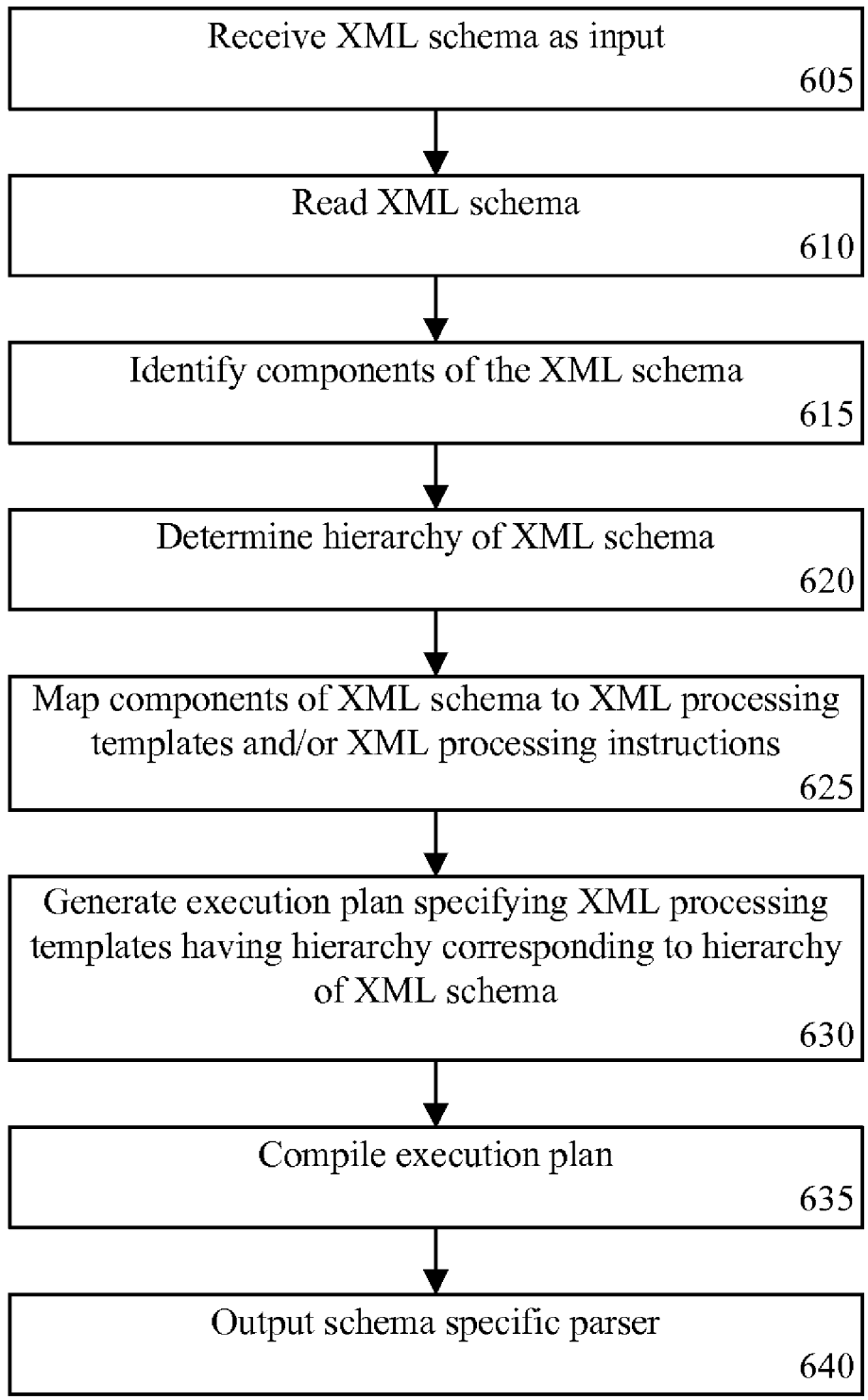
FIG. 6 is a flow chart illustrating a method of creating a schema specific parser in accordance with another embodiment of the present invention.

FIG. 6 is a flow chart illustrating a method 600 of creating a schema specific parser in accordance with another embodiment of the present invention. The method 600 can be implemented by a parser-generator as described with reference to FIG. 1. Accordingly, in step 605, the parser-generator can receive an XML schema as input. The parser generator can load the XML schema.

In step 610, the parser generator can read the XML schema. In step 615, the parser generator can identify the various components of the XML schema. In step 620, the parser-generator can determine a hierarchy of the XML schema. The hierarchy of the XML schema reflects the structure of the XML schema, as well as the structure of the XML documents to be validated against the XML schema. For example, the nesting of components and sub-components can be determined.

In step 625, the components of the XML schema can be mapped to a plurality of XML processing instructions. As noted, each XML processing instruction can be associated with a particular XML processing template from the XML processing template library. In step 630, an execution plan specifying a hierarchy of XML processing instructions, and thus templates, can be generated. The hierarchy of XML processing instructions specified by the execution plan can match or correspond to the hierarchy of components the XML schema.

In step 635, the execution plan can be compiled. In compiling the execution plan, any dependent references can be resolved. Various parameters needed by particular XML processing instructions, e.g., minimum and/or maximum component occurrences, can be determined. In this manner, the XML processing instructions can be parameterized according to the components of the XML schema. Each XML processing instruction can be replaced with the template code associated with that XML processing instruction. Parameters of the XML processing instruction can be used to set parameters of, or within, the template code. The source code, e.g., parameterized template code, can be compiled. In step 640, the parser-generator can output the compiled code, e.g., the schema specific parser.

As noted, in one embodiment, the parser-generator can be configured to generate a schema specific parser in a specified programming language. In another embodiment, the parser-generator can be configured to output a plurality of schema specific parsers, where each schema specific parser is implemented and compiled in a different programming language.

FIG. 7 is an example of an XML schema fragment 700 which is useful for understanding the embodiments disclosed herein. The XML schema fragment 700 defines a component, and more particularly, a complex type component "Example-Type." The ExampleType component has three attributes denoted as "attr1," "attr2," and "attr3," as well as a sequence of several components, e.g., sub-components. The sequence of sub-components can include either one of "Name1" or "Name2" followed by "Name3."

FIG. 8 is an example of an XML document 800 that is to be validated against the XML schema fragment pictured in FIG. 7. The XML document 800 includes a sequence of sub-components including "Name2" followed by "Name3". The XML document 800 further specifies values for each of attributes attr1, attr2, and attr3.

FIG. 9 is an example of a fragment of an execution plan 900 that can be automatically generated by the system of FIG. 1 in accordance with another embodiment of the present invention. As noted, the execution plan fragment 900 can include a hierarchy of XML processing instructions that correspond to the hierarchy of the XML schema upon which the execution plan is built, e.g., the XML schema fragment of FIG. 7. Accordingly, the execution plan fragment 900 has not yet been compiled. As each XML processing instruction can be associated with a template, it should be appreciated that references to XML processing instructions in describing the execution plan fragment 900 further reference the associated templates.

Since the XML schema fragment provides for three attributes, one of which is required, the "ASSERT_ATTRS" XML processing instruction is inserted with parameters permitting the attributes and requiring one. After, three "ASSERT_ATTR_CONTENT" XML processing instructions are inserted into the execution plan 900 to ensure that the type of the attribute content is as specified in the XML schema fragment. The "READ_TAG_QNAMES" XML processing instruction obtains the next block of data from the instance document, in this case the XML document being validated as pictured in FIG. 8 and checks that the next component, in this case "Name2," is a legal follower of the previous component. The "READ_TAG_QNAMES" XML processing instruction ensures that the found tag is in the set of permitted tags. The "JUMP_TAG_NOT_EQUAL" XML processing instruction causes flow control to branch to the specified name offset when the current tag name does not match the provided component name. The "CALL_TYPE" XML processing instruction checks the instance element for xsi-type declarations and jumps to the appropriate complex handler for the determined type (whether from the instance or the XML Schema specified default type). The remaining functions referenced in the execution plan fragment 900 perform functions similar to those already discussed.

As noted, each template refers to a block or portion of programming code that implements a particular XML document processing function, e.g., with respect to an XML schema component. At compile time, the templates referenced by the execution plan, via the XML processing instruction(s), can be inserted into the execution plan in place of the XML processing instructions. It should be appreciated that rather than replacing references to templates in the execution plan, the execution plan can be preserved and one or more new documents can be generated into which templates can be inserted. The templates can be inserted in a manner that preserves the hierarchy of the execution plan. In that case, the newly created documents can be compiled to generate the native schema specific parser. In any case, the hierarchically ordered templates can be parameterized and compiled to create a schema specific XML parser that can be incorporated into one or more different systems.

The particular templates discussed can be coded in any of a variety of programming languages. Accordingly, the execution plan 900 can be generic, or platform independent, in the sense that the particular code template inserted for a given XML processing instruction can depend upon which programming language is specified. In this manner, a schema specific parser can be generated for any of a plurality of different programming languages. Moreover, several parsers, e.g., one for each of a plurality of different programming languages, can be generated automatically from a single execution plan if so desired.

The flowchart and block diagram in the figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of creating a schema specific parser for processing Extensible Markup Language (XML) documents, the method comprising:
    identifying a plurality of XML processing templates, wherein each of the plurality of XML processing templates performs a specific task of processing an XML document against an XML schema component;
    receiving an XML schema comprising a plurality of components, the XML schema specifying classes of allowable XML documents or XML messages that a system will accept;
    determining a hierarchy of the plurality of components of the XML schema;
    creating an execution plan specifying a hierarchy of XML processing instructions, wherein each XML processing instruction is associated with an XML processing template from the plurality of XML processing templates, wherein the hierarchy of XML processing instructions is determined according to the hierarchy of components of the XML schema;
    compiling the execution plan to generate the schema specific parser; and
    outputting the schema specific parser.

2. The computer-implemented method of claim 1, wherein creating an execution plan further comprises selecting, for inclusion in the execution plan, at least one XML processing instruction associated with an XML processing template that reads a section of the XML document to be processed according to an expected component type of the section.

3. The computer-implemented method of claim 1, wherein creating an execution plan further comprises selecting, for inclusion in the execution plan, at least one XML processing instruction associated with an XML processing template that checks a section read by the schema specific parser against a component type associated with the section.

4. The computer-implemented method of claim 1, wherein creating an execution plan further comprises selecting, for inclusion in the execution plan, at least one XML processing instruction, which is associated with an XML processing template, that counts a number of occurrences of a component.

5. The computer-implemented method of claim 1, wherein creating an execution plan further comprises selecting, for inclusion in the execution plan, at least one XML processing instruction, which is associated with an XML processing template, that performs flow control within the schema specific parser.

6. The computer-implemented method of claim 1, wherein creating the execution plan further comprises parameterizing XML processing instructions of the execution plan according to the XML schema.

7. The computer-implemented method of claim 6, wherein compiling the execution plan further comprises replacing each XML processing instruction within the execution plan with the template code associated with the XML processing instruction.

8. The computer-implemented method of claim 1, further comprising associating each XML processing instruction with at least two portions of template code, wherein each portion of template code is in a different programming language.

9. The computer-implemented method of claim 8, wherein compiling further comprises replacing each XML processing instruction within the execution plan with the template, associated with the XML processing instruction, that is coded in a selected programming language in which the schema specific parser is to be created.

10. A system for creating a schema specific parser for processing Extensible Markup Language (XML) documents, the system comprising:
    a processor; and
    a computer-readable storage having stored thereon:
        a library comprising a plurality of XML processing templates, wherein each XML processing template comprises source code that, when compiled, performs a particular task of processing an XML document against an XML schema component; and
        a parser generator that determines a hierarchy of an XML schema, the XML schema specifying classes of allowable XML documents or XML messages that the system, or another system, will accept, and creates an execution plan specifying a hierarchy of XML processing instructions according to the hierarchy of the XML schema, wherein each XML processing instruction is associated with an XML processing template of the plurality of XML processing templates;
    wherein the parser generator compiles the execution plan and outputs the schema specific parser.

11. The system of claim 10, wherein the parser generator parameterizes templates of the execution plan according to the XML schema.

12. The system of claim 11, wherein the parser generator replaces each XML processing instruction within the execution plan with template code associated with the XML processing instruction.

13. A computer program product comprising:
    a computer-readable storage having computer-usable program code stored thereon that creates a schema specific parser for processing Extensible Markup Language (XML) documents, the computer program product comprising:
    computer-usable program code that identifies a plurality of XML processing templates, wherein each of the plurality of XML processing templates performs a specific task of processing an XML document against an XML schema component;
    computer-usable program code that receives an XML schema comprising a plurality of components, the XML schema specifying classes of allowable XML documents or XML messages that a system will accept;

computer-usable program code that determines a hierarchy of the plurality of components of the XML schema;

computer-usable program code that creates an execution plan specifying a hierarchy of XML processing instructions, wherein each XML processing instruction is associated with an XML processing template from the plurality of XML processing templates, wherein the hierarchy of XML processing instructions is determined according to the hierarchy of components of the XML schema;

computer-usable program code that compiles the execution plan to generate the schema specific parser; and computer-usable program code that outputs the schema specific parser.

14. The computer program product of claim 13, wherein the computer-usable program code that creates an execution plan further comprises computer-usable program code that selects, for inclusion in the execution plan, at least one XML processing instruction associated with an XML processing template that reads a section of the XML document to be processed according to an expected component type of the section.

15. The computer program product of claim 13, wherein the computer-usable program code that creates an execution plan further comprises computer-usable program code that selects, for inclusion in the execution plan, at least one XML processing instruction associated with an XML processing template that checks a section read by the schema specific parser against a component type associated with the section.

16. The computer program product of claim 13, wherein the computer-usable program code that creates an execution plan further comprises computer-usable program code that selects, for inclusion in the execution plan, at least one XML processing instruction, which is associated with an XML processing template, that counts a number of occurrences of a component.

17. The computer program product of claim 13, wherein the computer-usable program code that creates an execution plan further comprises computer-usable program code that selects, for inclusion in the execution plan, at least one XML processing instruction, which is associated with an XML processing template, that performs flow control within the schema specific parser.

18. The computer program product of claim 13, wherein the computer-usable program code that creates the execution plan further comprises computer-usable program code that parameterizes XML processing instructions of the execution plan according to the XML schema, and wherein the computer-usable program code that compiles the execution plan further comprises computer-usable program code that replaces each XML processing instruction within the execution plan with the template associated with the XML processing instruction.

19. The computer program product of claim 13, wherein the computer-usable medium further comprises computer-usable program code that associates each XML processing instruction with at least two portions of template code, wherein each portion of template code is in a different programming language.

20. The computer program product of claim 19, wherein the computer-usable program code that compiles further comprises computer-usable program code that replaces each XML processing instruction within the execution plan with the template, associated with the XML processing instruction, that is coded in a selected programming language in which the schema specific parser is to be created.

* * * * *